United States Patent [19]

Parker et al.

[11] Patent Number: 4,939,115
[45] Date of Patent: Jul. 3, 1990

[54] ORGANIC ACID-TREATED AMORPHOUS SILICAS FOR REFINING GLYCERIDE OILS

[75] Inventors: Perry M. Parker, Finksburg; William A. Welsh, Fulton, both of Md.

[73] Assignee: W. R. Grace & Co.-Conn., New York, N.Y.

[21] Appl. No.: 25,748

[22] Filed: Mar. 13, 1987

Related U.S. Application Data

[62] Division of Ser. No. 823,217, Jan. 28, 1986, Pat. No. 4,734,226.

[51] Int. Cl.$^5$ .......................... B01J 20/10; B01J 20/22
[52] U.S. Cl. ..................................... 502/401; 502/408
[58] Field of Search .................... 502/408, 158, 401

[56] References Cited

U.S. PATENT DOCUMENTS

| | | | |
|---|---|---|---|
| 1,864,988 | 6/1932 | Downs | 502/401 |
| 2,027,948 | 1/1936 | Wollner et al. | 502/408 |
| 2,701,240 | 2/1955 | Bregar | 502/408 |
| 2,886,512 | 5/1959 | Winyall | 208/120 |
| 3,284,213 | 11/1966 | Van Akkeren | 426/254 |
| 3,955,004 | 5/1976 | Strauss | 426/254 |
| 4,049,686 | 9/1977 | Ringers et al. | 260/424 |
| 4,298,622 | 11/1981 | Singh et al. | 426/72 |
| 4,330,564 | 5/1982 | Friedman | 426/417 |
| 4,443,379 | 4/1984 | Taylor et al. | 260/420 |
| 4,629,588 | 12/1986 | Welsh et al. | 260/428 |

FOREIGN PATENT DOCUMENTS

| | | | |
|---|---|---|---|
| 1424443 | 6/1965 | France | |
| 3093348 | 4/1988 | Japan | 502/408 |
| 2127035 | 4/1984 | United Kingdom | |

OTHER PUBLICATIONS

GB 865,807; Unilever, Ltd.; 1961.
Mag; J. Am. Oil Chem. Soc.; vol. 50, pp. 251–254, 1973.
Gutfinger; J. Am. Oil Chem. Soc.; vol. 55, pp. 856–859, 1978.
Alfa-Laval AB; Res. Discl.; vol. 203, pp. 110–111, 1981.
Tandy et al.; J. Am. Oil Chem. Soc.; vol. 61, pp. 1253–1258, 1984.
Vinyukova et al.; Food/Feed Chem; vol. 17–19/ pp. 12–15, 1984.
Arutyunyan et al.; WPI 81-32097D/18.
Brown et al.; Oil Chem. Mtg.; 1984.
Handel et al.; J. Food Sci.; vol. 49, pp. 1399–1340, 1984.

*Primary Examiner*—Carl F. Dees
*Attorney, Agent, or Firm*—Jill H. Krafte

[57] ABSTRACT

Adsorbents comprising organic acid-treated amorphous silicas with effective average pore diameters of about 60 to about 5000 Angstroms are useful in processes for the removal of trace contaminants, specifically phospholipids and associated metal ions, from glyceride oils.

9 Claims, No Drawings

ORGANIC ACID-TREATED AMORPHOUS SILICAS FOR REFINING GLYCERIDE OILS

This is a division of application Ser. No. 823,217 filed Jan. 28, 1986 now U.S. Pat. No. 4,734,226.

BACKGROUND OF THE INVENTION

This invention relates to a method for refining glyceride oils by contacting the oils with an adsorbent capable of selectively removing trace contaminants. More specifically, it has been found that novel organic acid-treated amorphous silicas of suitable porosity have superior properties for the adsorption of phospholipids and associated metal containing species from glyceride oils. This facilitates the production of oil products with substantially lowered concentrations of these trace contaminants. The term "glyceride oils" as used herein is intended to encompass all lipid compositions, including vegetable oils and animal fats and tallows. This term is primarily intended to describe the so-called edible oils, i.e., oils derived from fruits or seeds of plants and used chiefly in foodstuffs, but it is understood that oils whose end use is as non-edibles are to be included as well. It should be recognized that the method of this invention also can be used to treat fractionated streams derived from these sources.

Crude glyceride oils, particularly vegetable oils, are refined by a multi-stage process, the first step of which is degumming by treatment typically with water or with a chemical such as phosphoric acid, citric acid or acetic anhydride. Gums may be separated from the oil at this point or carried into subsequent phases of refining. A broad range of chemicals and operating conditions have been used to perform hydration of gums for subsequent separation. For example, Vinyukova et al., "Hydration of Vegetable Oils by Solutions of Polarizing Compounds," Food and Feed Chem., Vol. 17-9, pp. 12-15 (1984), discloses using a hydration agent containing citric acid, sodium chloride and sodium hydroxide in water to increase the removal of phospholipids from sunflower and soybean oils. U.S. Pat. No. 4,049,686 (Ringers et al.) discloses dispersing a substantially concentrated acid or anhydride in the oil, adding water and separating the aqueous phase containing gums and phospholipids. It is disclosed that acetic acid, citric acid, tartaric acid, lactic acid, etc. are most preferred. In addition to the use of organic acids during oil degumming, citric acid and other weak acids have been used as trace metal deactivating agents to promote taste and oxidative stability of edible oils.

After degumming, the oil may be refined by a chemical process including neutralization, bleaching and deodorizing steps. Alternatively, a physical process may be used, including a pretreating and bleaching step and a steam refining and deodorizing step. Physical refining processes do not include a caustic refining step. State-of-the-art processes for both physical and chemical refining are described by Tandy et al. in "Physical Refining of Edible Oil," J. Am. Oil Chem. Soc., Vol. 61, pp. 1253-58 (July 1984). One object of either refining process is to reduce the levels of phospholipids, which can lend off colors, odors and flavors to the finished oil product. In addition, ionic forms of the metals calcium, magnesium, iron and copper are thought to be chemically associated with phospholipids and to negatively effect the quality and stability of the final oil product.

The removal of phospholipids from edible oils has been the object of a number of previously proposed physical process steps in addition to the conventional chemical processes. For example, Gutfinger et al., "Pretreatment of Soybean Oil for Physical Refining: Evaluation of Efficiency of Various Adsorbents in Removing Phospholipids and Pigments," J. Amer. Oil Chem. Soc., Vol. 55, pp. 856-59 (1978), describes a study of several adsorbents, including Tonsil L80 (TM) and Tonsil ACC (TM) (Sud Chemie, A.G.), Fuller's earth, Celite (TM) (Johns-Manville Products Corp.), Kaoline (sic), silicic acid and Florosil (sic) (TM) (Floridin Co.), for removing phospholipids and color bodies from phosphoric acid degummed soybean oil.

SUMMARY OF THE INVENTION

Trace contaminants, such as phospholipids and associated metal ions, can be removed effectively from glyceride oils by adsorption onto amorphous silica. It now has been found that the presence of an organic acid in the pores of the silica adsorbent greatly improves its ability to remove these contaminants. The process described herein utilizes amorphous silicas having an average pore diameter of greater than 60 Angstroms which have been treated with organic acids, such as citric, acetic, ascorbic or tartaric acids, or solutions thereof, in such a manner that at least a portion of the organic acid is retained in the pores of the silica.

It is the primary object of this invention to make feasible a physical refining process by providing a method for reducing the phospholipid content of degummed oils to acceptable levels. Adsorption of phospholipids and associated contaminants onto acid-treated amorphous silica in the manner described can eliminate any need to use caustic refining, thus eliminating one unit operation, as well as the need for wastewater treatment from that operation. The silicas of this invention also can be used to replace bleaching earth in conventional caustic refining. Appreciable cost savings are realized with the use of acid-treated amorphous silica, which allows for significantly reduced adsorbent loadings and organic acid usage. Over and above the cost savings realized from simplification of the oil processing, the overall value of the product is increased since aqueous soapstock, a significant by-product of caustic refining, has little value.

The use of the organic acid-treated silica adsorbent is substantially more economical than separate treatments with acid and with adsorbent. Moreover, separate storage of citric or other acid is eliminated, as is the separate process step for the addition of the acid. Separate acid treatment also requires centrifugal separation of the acid from oil, or else the use of large quantities of solids such as bleaching earth to absorb the separated phase. By contrast, the method of this invention utilizes an efficient method for bringing the oil and acid together, followed by a simple physical separation of the solid adsorbent from the liquid oil.

It is also intended that use of the method of this invention may reduce, or potentially eliminate, the need for bleaching earth steps. Treatment of glyceride oil with the acid-treated silica adsorbent increases the oil's propensity for decolorization to an extent where it may be possible to utilize heat bleaching instead of a bleaching earth step to achieve acceptable oil decolorization. Reduction or elimination of the bleaching earth step will result in substantial oil conservation as this step typically results in significant oil loss. Moreover, since spent bleaching earth has a tendency to undergo spontaneous combustion, reduction or elimination of this step will yield an occupationally and environmentally safer process.

Another object of this invention is to provide a physical refining method which can be used with oils that have been damaged by improper storage or handling, which are difficult to refine and which previously required caustic refining methods. Concern over such oils previously has severely limited the use of physical refining methods in the oil industry.

DETAILED DESCRIPTION OF THE INVENTION

It has been found that certain organic acid-treated amorphous silicas are particularly well suited for removing trace contaminants, specifically phospholipids and associated metal ions, from glyceride oils to yield oils having commercially acceptable levels of those contaminants. The process for the removal of these trace contaminants, as described in detail herein, essentially comprises the steps of selecting a glyceride oil with a phosphorus content in excess of about 1.0 ppm, selecting an adsorbent comprising a suitable amorphous silica which has been treated with an organic acid, contacting the glyceride oil and the adsorbent, allowing the phospholipids and associated metal ions to be adsorbed, and separating the resulting phospholipid- and metal ion-depleted glyceride oil from the adsorbent. Suitable amorphous silicas for this process are those with pore diameters greater than about 60A. The amorphous silica is pre-treated with an organic acid such as citric, acetic, tartaric or ascorbic acid in such a manner that at least a portion of the organic acid is retained in pores of the silica. It is preferred that the total volatiles content of the acid-treated amorphous silica be at least about 10%, preferably at least about 30%, most preferably at least about 60%.

The process described herein can be used for the removal of phospholipids from any glyceride oil, for example, oils of soybean, rapeseed, peanut, corn, sunflower, palm, coconut, olive, cottonseed, etc. Treatment of animal fats and tallows is anticipated as well. Removal of phospholipids from edible oils is a significant step in the oil refining process because residual phosphorus can cause off colors, odors and flavors in the finished oil. Typically, the acceptable concentration of phosphorus in the finished oil product should be less than about 15.0 ppm, preferably less than about 5.0 ppm, according to general industry practice. As an illustration of the refining goals with respect to trace contaminants, typical phosphorus levels in soybean oil at various stages of chemical refining are shown in Table I. Phosphorus levels at corresponding stages in physical refining processes will be comparable.

TABLE I[1]

| Stage | Trace Contaminant Levels (ppm) | | | | |
|---|---|---|---|---|---|
| | P | Ca | Mg | Fe | Cu |
| Crude Oil | 450–750 | 1–5 | 1–5 | 1–3 | 0.03–0.05 |
| Degummed Oil | 60–200 | 1–5 | 1–5 | 0.4–0.5 | 0.02–0.04 |
| Caustic Refined Oil | 10–15 | 1 | 1 | 0.3 | 0.003 |
| End Product | 1–15 | 1 | 1 | 0.1–0.3 | 0.003 |

[1]Data assembled from the Handbook of Soy Oil Processing and Utilization, Table I, p. 14 (1980), and from FIG. 1 from Christenson, Short Course: Processing and Quality Control of Fats and Oils, presented at American Oil Chemists' Society, Lake Geneva, WI (May 5–7, 1983).

In addition to phospholipid removal, the process of this invention also removes from edible oils ionic forms of the metals calcium, magnesium, iron and copper, which are believed to be chemically associated with phospholipids. These metal ions themselves have a deleterious effect on the refined oil products. Calcium and magnesium ions can result in the formation of precipitates. The presence of iron and copper ions promote oxidative instability. Moreover, each of these metal ions is associated with catalyst poisoning where the refined oil is catalytically hydrogenated. Typical concentrations of these metals in soybean oil at various stages of chemical refining are shown in Table I. Metal ion levels at corresponding stages of physical refining processes will be comparable. Throughout the description of this invention, unless otherwise indicated, reference to the removal of phospholipids is meant to encompass the removal of associated trace contaminants as well.

The term "amorphous silica" as used herein is intended to embrace silica gels, precipitated silicas, dialytic silicas and fumed silicas in their various prepared or activated forms. The specific manufacturing process used to prepare the amorphous silica is not expected to affect its utility in this method. Acid treatment of the amorphous silica adsorbent selected for use in this invention may be conducted as a step in the silica manufacturing process or at a subsequent time. The acid treatment process is described below.

Both silica gels and precipitated silicas are prepared by the destabilization of aqueous silicate solutions by acid neutralization. In the preparation of silica gel, a silica hydrogel is formed which then typically is washed to low salt content. The washed hydrogel may be milled, or it may be dried, ultimately to the point where its structure no longer changes as a result of shrinkage. The dried, stable silica is termed a xerogel. In the preparation of precipitated silicas, the destabilization is carried out in the presence of inorganic salts, which lower the solubility of silica and cause precipitation of hydrated silica. The precipitate typically is filtered, washed and dried. For preparation of xerogels or precipitates useful in this invention, it is preferred to dry them and then to add water to reach the desired water content before use. However, it is possible to initially dry the gel or precipitate to the desired water content. Dialytic silica is prepared by precipitation of silica from a soluble silicate solution containing electrolyte salts (e.g., $NaNO_3$, $Na_2SO_4$, $KNO_3$) while electrodialyzing, as described in pending U.S. patent application Ser. No. 533,206 (Winyall), "Particulate Dialytic Silica," filed Sept. 20, 1983. Fumed silicas (or pyrogenic silicas) are prepared from silicon tetrachloride by high-temperature hydrolysis, or other convenient methods.

In the preferred embodiment of this invention, the amorphous silica selected for use will be a hydrogel. The characteristics of hydrogels are such that they effectively adsorb trace contaminants from glyceride oils and that they exhibit superior filterability as compared with other forms of silica. The selection of hydrogels therefore will facilitate the overall refining process.

It is also preferred that the selected silica adsorbent will have the highest possible surface area in pores which are large enough to permit access to the phospholipid molecules, while being capable of maintaining good structural integrity upon contact with fluid media. The requirement of structural integrity is particularly important where the silica adsorbents are used in continuous flow systems, which are susceptible to disruption and plugging. Amorphous silicas suitable for use in this process have surface areas of up to about 1200 square meters per gram, preferably between 100 and 1200 square meters per gram. It is preferred, as well, for as much as possible of the surface area to be contained in pores with diameters greater than 60A.

The method of this invention utilizes amorphous silicas with substantial porosity contained in pores having diameters greater than about 60A, as defined herein, after appropriate activation. Activation typically is by heating to temperatures of about 450° to 700° F. (230° to 360° C.) in vacuum. One convention which describes silicas is average pore diameter ("APD"), typically defined as that pore diameter at which 50% of the surface area or pore volume is contained in pores with diameters greater than the stated APD and 50% is contained in pores with diameters less than the stated APD. Thus, in amorphous silicas suitable for use in the method of this invention, at least 50% of the pore volume will be in pores of at least 60A diameter. Silicas with a higher proportion of pores with diameters greater than 60A will be preferred, as these will contain a greater number of potential adsorption sites. The practical upper APD limit is about 5000A.

Silicas which have measured intraparticle APDs within the stated range will be suitable for use in this process. Alternatively, the required porosity may be achieved by the creation of an artificial pore network of interparticle voids in the 60 to 5000A range. For example, non-porous silicas (i.e., fumed silica) can be used as aggregated particles. Silicas, with or without the required porosity, may be used under conditions which create this artificial pore network. Thus the criterion for selecting suitable amorphous silicas for use in this process is the presence of an "effective average pore diameter" greater than 60A. This term includes both measured intraparticle APD and interparticle APD, designating the pores created by aggregation or packing of silica particles.

The APD value (in Angstroms) can be measured by several methods or can be approximated by the following equation, which assumes model pores of cylindrical geometry:

$$APD (A) = \frac{40,000 \times PV \text{ (cc/gm)}}{SA \text{ (m}^2/\text{gm)}}, \quad (1)$$

where PV is pore volume (measured in cubic centimeters per gram) and SA is surface area (measured in square meters per gram).

Both nitrogen and mercury porosimetry may be used to measure pore volume in xerogels, precipitated silicas and dialytic silicas. Pore volume may be measured by the nitrogen Brunauer-Emmett-Teller ("B-E-T") method described in Brunauer et al., J. Am. Chem. Soc., Vol 60, p. 309 (1938). This method depends on the condensation of nitrogen into the pores of activated silica and is useful for measuring pores with diameters up to about 600A. If the sample contains pores with diameters greater than about 600A, the pore size distribution, at least of the larger pores, is determined by mercury porosimetry as described in Ritter et al., Ind. Eng. Chem. Anal. Ed. 17,787 (1945). This method is based on determining the pressure required to force mercury into the pores of the sample. Mercury porosimetry, which is useful from about 30 to about 10,000A, may be used alone for measuring pore volumes in silicas having pores with diameters both above and below 600A. Alternatively, nitrogen porosimetry can be used in conjunction with mercury porosimetry for these silicas. For measurement of APDs below 600A, it may be desired to compare the results obtained by both methods. The calculated PV volume is used in Equation (1).

For determining pore volume of hydrogels, a different procedure, which assumes a direct relationship between pore volume and water content, is used. A sample of the hydrogel is weighed into a container and all water is removed from the sample by vacuum at low temperatures (i.e., about room temperature). The sample is then heated to about 450° to 700° F. to activate. After activation, the sample is re-weighed to determine the weight of the silica on a dry basis, and the pore volume is calculated by the equation:

$$PV \text{ (cc/gm)} = \frac{\% \, TV}{100 - \% \, TV}, \quad (2)$$

where TV is total volatiles, determined by the wet and weight differential. The PV value calculated in this manner is then used in Equation (1).

The surface area measurement in the APD equation is measured by the nitrogen B-E-T surface area method, described in the Brunauer et al., article, supra. The surface area of all types of appropriately activated amorphous silicas can be measured by this method. The measured SA is used in Equation (1) with the measured PV to calculate the APD of the silica.

The purity of the amorphous silica used in this invention is not believed to be critical in terms of the adsorption of phospholipids. However, where the finished products are intended to be food grade oils care should be taken to ensure that the silica used does not contain leachable impurities which could compromise the desired purity of the product(s). It is preferred, therefore, to use a substantially pure amorphous silica, although minor amounts, i.e., less than about 10%, of other inorganic constituents may be present. For example, suitable silicas may comprise iron as $Fe_2O_3$, aluminum as $Al_2O_3$, titanium as $TiO_2$, calcium as $CaO$, sodium as $Na_2O$, zirconium as $ZrO_2$, and/or trace elements.

It has been found that the effectiveness of amorphous silicas of this description in removing trace contaminants from glyceride oils is dramatically improved by pre-treating the silica with an organic acid. It is desired that the silica pores contain either a pure organic acid or an aqueous solution thereof. In the preferred embodiment, the acid will be citric acid or tartaric acid. Alternatively, acetic acid or ascorbic acid may be used. The acids may be used singly or in combination. The treatment may be with neat acid or with an aqueous acid solution diluted to a concentration as low as about 0.05M. The preferred concentration is at least about 0.25M. The total volatiles content of the acid-treated silica should be about 10% to about 80%, preferably at least about 30%, and most preferably about 60 to 80%.

The amorphous silica can be treated with the acidic solution in several ways. First, the silica may be slurried in the acidic solution for long enough for the acid to enter the pores of the silica, typically a period of at least about one half hour, up to about twenty hours. The slurry preferably will be agitated during this period to increase entry of the organic acid into the pore structure of the amorphous silica. The acid-treated silica is then conveniently separated from the solution by filtration and may be dried to the desired total volatiles content.

Alternatively, the acid solution can be introduced to the amorphous silica in a fixed bed configuration, for a similar period of contact. This would be particularly advantageous for treating unsized, washed silica hydrogel, since it would eliminate the standard dewatering/filtration step in processing the hydrogel. A third method is by introducing a fine spray or jet of the organic solution into the amorphous silica as it is fed to a milling/sizing operation. For this method, it will be preferred to use a concentrated acid. These latter two methods will be preferred for treating silica in a commercial scale operation.

The adsorption step itself is accomplished by conventional methods in which the organic acid-treated amorphous silica and the oil are contacted, preferably in a manner which facilitates the adsorption. The adsorption step may be by any convenient batch or continuous process. In any case, agitation or other mixing will enhance the adsorption efficiency of the treated silica.

The adsorption may be conducted at any convenient temperature at which the oil is a liquid. The glyceride oil and acid-treated silica are contacted as described above for a period sufficient to achieve the desired phospholipid content in the treated oil. The specific contact time will vary somewhat with the selected process, i.e., batch or continuous, and with the condition of the oil to be treated. In addition, the adsorbent usage, that is, the relative quantity of adsorbent brought into contact with the oil, will affect the amount of phospholipids removed. The adsorbent usage is quantified as the weight percent of amorphous silica (on a dry weight basis after ignition at 1750° F.), calculated on the weight of the oil processed.

The adsorbent usage may be from about 0.003% to about 1%. As seen in the Examples, significant reduction in phospholipid content is achieved by the method of this invention. At a given adsorbent loading, the acid-treated silica of this invention significantly outperforms untreated silica and will bring about a greater reduction in the phospholipid content of the glyceride oil. Alternatively, it can be seen that to achieve a desired degree of phospholipid reduction, substantially less silica need be used if it has been acid-treated in the manner of this invention. The specific phosphorus content of the treated oil will depend primarily on the oil itself, as well as on the silica, usage, process, etc. However, phosphorus levels of less than 15 ppm, preferably less than 5.0 ppm, can be achieved, particularly with adsorbent loadings of at least about 0.6%.

Following adsorption, the phospholipid-enriched silica is filtered from the phospholipid-depleted oil by any convenient filtration means. The oil may be subjected to additional finishing processes, such as steam refining, bleaching and/or deodorizing. The method described herein may reduce the phosphorus levels sufficiently to eliminate the need for bleaching earth steps. In addition to removing the phospholipids and other contaminants, the described treatment method increases the capacity of the oil to be decolorized, making it feasible to use heat bleaching instead of bleaching earth.

Even where bleaching earth operations are to be employed for decoloring the oil, treatment with both acid-treated amorphous silica and bleaching earth provides an extremely efficient overall process. Treatment may be either sequential or simultaneous. For example, by first using the method of this invention to decrease the phospholipid content, and then treating with bleaching earth, the latter step is caused to be more effective. Therefore, either the quantity of bleaching earth required can be significantly reduced, or the bleaching earth will operate more effectively per unit weight. It may be feasible to elute the adsorbed contaminants from the spent silica in order to re-cycle the silica for further oil treatment.

The examples which follow are given for illustrative purposes and are not meant to limit the invention described herein. The following abbreviations have been used throughout in describing the invention:

A—Angstrom(s)
APD—average pore diameter
B-E-T—Brunauer-Emmett-Teller
Ca—calcium
cc—cubic centimeter(s)
cm—centimeter
Cu—copper
° C.—degrees Centigrade
° F.—degrees Fahrenheit
Fe—iron
gm—gram(s)
ICP—Inductively Coupled Plasma
m—meter
Mg—magnesium
min—minutes
ml—milliliter(s)
P—phosphorus
ppm—parts per million
%—percent
PV—pore volume
RH—relative humidity
SA—surface area
sec—seconds
TV—total volatiles
wt—weight

EXAMPLE I (Adsorbents and Oils Used)

The adsorbents used in the following Examples are listed in Table II, together with their relevant properties. These properties characterize the adsorbents where they were used "as is."

TABLE II

| Adsorbent | Description | Av. Pore Diameter[1] | Total Volatiles[2] |
|---|---|---|---|
| 1 | Silica Hydrogel[3] | 80.0 | 62.37 |
| 2 | Silica Hydrogel[3] | 240.0 | 68.99 |
| 3 | Amorphous Silica[3] (Sylox 15 TM) | 400.0 | 12.48 |
| 4 | Silica Xerogel[3] | 170.0 | 7.92 |
| 5 | Bleaching Earth[4] (Tonsil LFF-80 TM) | — | 1.48 |
| 6 | Bleaching Earth[5] (Filtrol 105 TM) | — | 2.20 |

[1] Average pore diameter (APD) calculated as described above.
[2] Total volatiles, in wt. %, on ignition at 1750° F. (955° C.).
[3] Davison Chemical Division of W. R. Grace & Co. (Sylox 15 TM is made in accordance with U.S. Pat. No. 3,959,174, to an average pore size of about 20.0 microns.)
[4] Sud Chemie, A. G.
[5] Filtrol Corporation, Clay Products Division.

Three different oil samples were used in these Examples, listed as Oil Samples 1–4 in Table III. The concentrations of trace contaminants were determined for each sample by inductively-coupled plasma ("ICP") emission spectroscopy. The crude rapeseed oil designated as Sample 1 was water-degummed in the laboratory to yield Sample 2. A 500.0 gm portion of oil Sample 1 was heated to 70.0° C. under nitrogen, 5.0 gm water added and the resulting mixture stirred for 20 minutes under nitrogen. The oil was cooled to 40.0° C. and 25.0 gm of de-ionized water added, followed by mixing for one hour. The oil/water mixture was centrifuged and the degummed oil decanted. The degummed oil was designated Sample 2.

TABLE III

| Oil Sample | Trace Contaminant Levels (ppm)[1] | | | |
|---|---|---|---|---|
| | P | Ca | Mg | Fe |
| 1 Rapeseed (crude) | 149.0 | 107.0 | 20.0 | 3.0 |
| 2 Rapeseed (lab. degummed) | 82.0 | 90.0 | 14.0 | 2.0 |
| 3 Rapeseed (coml. degummed) | 44.0 | 56.0 | 7.0 | 1.0 |
| 4 Soybean (coml. degummed) | 132.0 | 89.0 | 37.0 | 1.0 |

[1]Trace contaminant levels measured in parts per million versus standards by in-directly-coupled plasma (ICP) emission spectroscopy.

EXAMPLE II (Preparation of Acid-Treated Adsorbents)

The citric acid-treated amorphous silicas and bleaching earths used in these Examples were prepared according to the following procedures. A 300.0 ml volume of 0.25M citric acid solution (pH 1.9) was made by dissolving 15.8 gm citric acid monohydrate crystals in deionized water. Next, 30.0 gm (dry basis) of adsorbent was added and the resulting slurry was agitated for one-half hour at room temperature. The slurry then was filtered on a vacuum filter until the total volatiles content was about 60 to 70%. Other acid treatments (Examples V and VI) were done according to these procedures, using the indicated acids and concentrations.

Table IV indicates the properties of a citric acid-treated silica hydrogel, Adsorbent No. 1 of Table II, and indicate that the water in the adsorbent equilibrated with the bulk citric acid solution.

TABLE IV

| Silica Hydrogel Adsorbent[1] | TV[2] (wt. %) | Carbon[3] (wt. %) | Calc. Carbon[4] (wt. %) | pH[5] |
|---|---|---|---|---|
| 1 Untreated | 69.5 | 0.03 | — | — |
| 2 0.25 M Citric | 69.9 | 0.83 | 1.06 | 2.4 |
| 3 0.5 M Citric | 69.8 | 1.48 | 2.14 | 2.8 |

[1]Treatment per Example II.
[2]Total volatiles measured by weight loss on ignition at 1750° F. (955° C.).
[3]Measured as is with Leco Carbon Determinator Model WR 12.
[4]Calculated on an as is basis from Example II, assuming the water in the adsorbent and the bulk acid in the treatment solution equilibrated.
[5]The pH was measured in a 5% SiO₂ slurry of the adsorbent in deionized water.

EXAMPLE III (Oil Treatment Procedures)

The oils listed in Table III were treated according to the following procedures. A 100.0 gm sample of the oil to be treated was heated at 100.0° C. in a covered glass beaker. The adsorbent to be treated then was added, on a dry weight basis, to the desired loading. For example, if a 0.1% (dry basis) loading of an amorphous silica with TV=65% was desired, that loading would be multiplied by 100/100-% TV to get the actual wet weight of the adsorbent, or 0.3 gm.

The hot oil/adsorbent mixture was vigorously agitated for one-half hour. The mixture then was vacuum filtered, leaving spent adsorbent on the filter and allowing clean oil to pass through. The oil was then analyzed for phosphorus and trace metals by ICP emission spectroscopy.

EXAMPLE IV (Treatment of Rapeseed Oil)

Laboratory de-gummed rapeseed oil (Sample No. 2 of Table III) was treated according to the procedures of Example III, using Adsorbent No. 2 from Table II (a silica hydrogel). The silica was used to treat the oil both as is and after treatment with citric acid according to the procedures of Example II. The adsorbent loadings were as indicated in Table V. It can be seen from the results, in Table V, that the acid-treated silica exhibited improved effectiveness in removing trace contaminants from the water de-gummed rapeseed oil as compared with untreated silica.

TABLE V

| Adsorbent | Loading[1] | Trace Contaminants[2] | | | |
|---|---|---|---|---|---|
| | | P | Fe | Mg | Ca |
| Blank | — | 82 | 2.0 | 14 | 90 |
| Untreated | 0.3 | 75 | 2.0 | 13 | 78 |
| Untreated | 0.6 | 60 | 2.0 | 12 | 72 |
| Acid-Treated | 0.3 | 43 | 1.0 | 8.0 | 49 |
| Acid-Treated | 0.6 | 6.5 | <1.0 | 1.0 | 7.0 |

[1]Loading as weight percent, dry basis.
[2]Parts per million, measured by ICP emission spectroscopy.

EXAMPLE V (Varying Treatments and Adsorbents)

Commercially de-gummed rapeseed oil (Sample No. 3 of Table III) was treated according to the procedures of Example III, using the Adsorbents listed in Table VI (the numbers correspond to those adsorbents whose properties are described in Table II). The adsorbents were used both as is and after acid treatment according to the procedures of Example II. The adsorbent loadings were as indicated in Table VI. It can be seen from the results, in Table VI, that acid treatment of amorphous silica dramatically improved the silicas' ability to remove phosphorus and trace metals from glyceride oils. By contrast, only a very minor improvement was shown with acid-treated bleaching earth.

TABLE VI

| Adsorbent[1] | Loading[2] | Trace Contaminants[3] | | | |
|---|---|---|---|---|---|
| | | P | Fe | Mg | Ca |
| — | — | 49 | 1 | 7 | 56 |
| 1 - Untreated | .3 | 32 | 1 | 6 | 44 |
| 1 - Untreated | .6 | 26 | <1 | 4 | 3 |
| 1 - .25 M Citric | .3 | 17 | <1 | 3 | 20 |
| 1 - .25 M Citric | .6 | 2 | 0 | 0 | 1 |
| 1 - .1 M Citric | .3 | 25 | <1 | 4 | 28 |
| 1 - .01 M Citric | .3 | 30 | <1 | 5 | 37 |
| 1 - .5 M Citric | .3 | 20 | <1 | 3 | 18 |
| 1 - .5 M Citric | .6 | 3 | 0 | <1 | <1 |
| 1 - 1.9 pH Acetic | .3 | 33 | <1 | 5 | 37 |
| 1 - 1.9 pH Acetic | .6 | 6 | <1 | <1 | 6 |
| 1 - .25 M Tartaric | .3 | 21 | <1 | 3 | 24 |
| 2 - Untreated | .3 | 30 | <1 | 5 | 37 |
| 2 - .25 M Citric | .3 | 20 | <1 | 3 | 23 |
| 2 - .25 M Citric | .6 | 4 | 0 | <1 | 4 |
| 3 - Untreated | .3 | 33 | <1 | 7 | 40 |
| 3 - .25 M Citric | .3 | 35 | <1 | 4 | 23 |
| 3 - .25 M Citric | .6 | 15 | <1 | 1 | 8 |
| 4 - Untreated | .3 | 33 | <1 | 5 | 41 |
| 4 - .25 M Citric | .3 | 22 | <1 | 3 | 25 |
| 4 - .25 M Citric | .6 | 3 | 0 | <1 | 2 |
| 5 - Untreated | .3 | 42 | 1 | 6 | 48 |

TABLE VI-continued

| Adsorbent[1] | Loading[2] | Trace Contaminants[3] | | | |
|---|---|---|---|---|---|
| | | P | Fe | Mg | Ca |
| 5 - .25 M Citric | .3 | 48 | <1 | 7 | 45 |
| 5 - .25 M Citric | .6 | 38 | <1 | 6 | 39 |
| 6 - Untreated | .3 | 46 | <1 | 7 | 47 |
| 6 - .25 M Citric | .3 | 47 | <1 | 7 | 46 |
| 6 - .25 M Citric | .6 | 43 | <1 | 6 | 43 |

[1]Treatment per Example II.
[2]Loading as weight percent, dry basis.
[3]Parts per million, measured by ICP emission spectroscopy.

EXAMPLE VI (Organic vs. Inorganic Acids)

Commercially de-gummed soybean oil (Sample No. 4 of Table III) was treated according to the procedures of Example III, using amorphous silica (Adsorbent Nos. 1-4 of Table II). The silicas were used both as is and after acid treatment according to the procedures of Example II. The adsorbent loadings were as indicated in Table VII. The mineral acids were used at 1.91 pH, which was derived by matching the pH of the very successful 0.25 M citric acid treatment solution. It can be seen from the results in Table VII, that significant improvement in adsorption is realized with citric acid-treated silica. By contrast, inorganic acid-treated silicas showed no improvement.

TABLE VII

| Adsorbent[1] | Loading[2] | Trace Contaminants[3] | | | |
|---|---|---|---|---|---|
| | | P | Fe | Mg | Ca |
| — | — | 132 | 1 | 37 | 89 |
| 1 - Untreated | .3 | 110 | 1 | 32 | 82 |
| 1 - Untreated | .6 | 87 | 1 | 33 | 80 |
| 1 - .25 M Citric | .3 | 72 | 1 | 20 | 52 |
| 1 - .25 M Citric | .6 | 4 | 0 | 1 | 2 |
| 1 - .5 M Citric | .3 | 76 | 1 | 20 | 52 |
| 1 - .5 M Citric | .6 | 3 | 0 | 1 | 1 |
| 1 - 1.91 pH $H_2SO_4$ | .3 | 109 | 1 | 31 | 87 |
| 1 - 1.91 pH HCl | .3 | 107 | 1 | 31 | 86 |
| 1 - 1.91 pH $H_3PO_4$ | .3 | 109 | 1 | 31 | 83 |
| 2 - Untreated | .3 | 107 | 1 | 31 | 81 |
| 2 - .25 M Citric | .3 | 87 | 1 | 28 | 70 |
| 2 - .25 M Citric | .6 | 13 | 1 | 2 | 10 |
| 3 - Untreated | .3 | 127 | 1 | 36 | 84 |
| 3 - .25 M Citric | .3 | 119 | 1 | 33 | 76 |
| 3 - .25 M Citric | .6 | 78 | 1 | 20 | 45 |
| 3 - .5 M Citric | .3 | 100 | 1 | 26 | 58 |
| 4 - Untreated | .3 | 125 | 1 | 35 | 83 |
| 4 - Untreated | .6 | 87 | 1 | 31 | 71 |
| 4 - .25 M Citric | .3 | 101 | 1 | 28 | 65 |
| 4 - .25 M Citric | .6 | 86 | 1 | 24 | 57 |

[1]Treatment per Example II.
[2]Loading as weight percent, dry basis.
[3]Parts per million, measured by ICP emission spectroscopy.

EXAMPLE VI

Free flowing citric acid-treated silica hydrogels were prepared by two methods, using the silica hydrogel which was designated in Table II as Adsorbent No. 1. For the first preparation (Adsorbent Preparation A of Table VIII), a citric acid solution was equilibrated with washed hydrogel, followed by milling. Silica hydrogel was prepared by the neutralization of sodium silicate with sulfuric acid. Washing with sulfuric acid (dilute) produced a washed hydrogel, which was milled in a hammer mill to about 20.0 microns average pore size. Equilibration of the milled material with a 0.212 M aqueous citric acid solution produced an effective adsorbent but the absorbent was difficult to handle. Alternatively, equilibration of washed hydrogel chunks (approximately 2.0 cm in diameter) with the aqueous citric acid solution was attempted and was accomplished in about two hours. The treated material was milled as above to yield a free flowing powder with good adsorption capabilities. Table VIII indicates the results obtained by treating soybean oil with this equilibrated and then milled material.

For the second preparation (Adsorbent Preparation B of Table VIII), a concentrated (50%) citric acid solution was applied to the hydrogel in the mill to give a measured carbon content equal to that of the first preparation (approximately 1.0%, on an as is basis). A free flowing powder resulted by maintaining the acid concentration low (about 1.0 weight percent).

Soybean oil was treated with each preparation and with the untreated hydrogel. As shown by the results in Table VIII, both methods of acid treatment were successful.

TABLE VIII

| Adsorbent Preparation | Loading[1] | Phosphorus Content[2] |
|---|---|---|
| — | — | 68.0 |
| Untreated | 0.15 | 59.0 |
| Untreated | 0.30 | 51.0 |
| Untreated | 0.60 | 32.0 |
| A - Citric Acid, Wash | 0.15 | 52.0 |
| A - Citric Acid, Wash | 0.30 | 17.0 |
| A - Citric Acid, Wash | 0.60 | 8.5 |
| B - Citric Acid, Mill | 0.15 | 53.0 |
| B - Citric Acid, Mill | 0.30 | 18.0 |
| B - Citric Acid, Mill | 0.60 | 2.0 |

[1]Loading as weight percent, dry basis.
[2]Parts per million, measured by ICP emission spectroscopy.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A composition suitable for use in the removal of trace contaminants, which are phospholipids and associated metal ions, from glyceride oils, comprising amorphous silica whose pores contain organic acid selected from the group consisting of citric acid, acetic acid, ascorbic acid, tartaric acid and solutions thereof, and which has a total volatiles content of at least about 10%.

2. The composition of claim 1 in which the total volatiles content of the treated amorphous silica is at least about 30%.

3. The composition of claim 1 in which said organic acid is neat acid or is an aqueous acid diluted to a concentration as low as about 0.05M.

4. The composition of claim 1 in which said amorphous silica has an effective average pore diameter of greater than 60 Angstroms.

5. The composition of claim 1 in which said amorphous silica is selected from the group consisting of silica gels, precipitated silicas, dialytic silicas and fumed silicas.

6. The composition of claim 5 in which said silica gel is a hydrogel.

7. The composition of claim 1 which is prepared by slurrying said amorphous silica in aqueous organic acid, separating the acid-treated silica and drying.

8. The composition of claim 1 which is prepared by introducing an aqueous organic acid solution to said amorphous silica in a fixed bed configuration.

9. The composition of claim 1 which is prepared by introducing a spray or jet of aqueous organic acid into said amorphous silica as it is fed to a milling or sizing operation.

* * * * *

UNITED STATES PATENT AND TRADEMARK OFFICE
CERTIFICATE OF CORRECTION

PATENT NO.  : 4,939,115
DATED       : July 3, 1990
INVENTOR(S) : Perry M. Parker & William A. Welsh It is certified that error appears in the above-identified patent and that said Letters Patent is hereby corrected as shown below:

Column 6, line 21   :   After the words "wet and" insert --dry--.

Column 12, line 16  :   Change "absorbent" to --adsorbent--.

Signed and Sealed this

Second Day of July, 1991

Attest:

HARRY F. MANBECK, JR.

*Attesting Officer*        *Commissioner of Patents and Trademarks*